(No Model.) 4 Sheets—Sheet 3.

J. PURVES.
PROCESS OF MAKING GAS AND APPARATUS THEREFOR.

No. 545,973. Patented Sept. 10, 1895.

WITNESSES
C. M. Clarke
H. W. Hyde.

INVENTOR
James Purves
by his attorneys
W. Bakewell Sons (No Model.) 4 Sheets—Sheet 4.
J. PURVES.
PROCESS OF MAKING GAS AND APPARATUS THEREFOR.
No. 545,973. Patented Sept. 10, 1895.
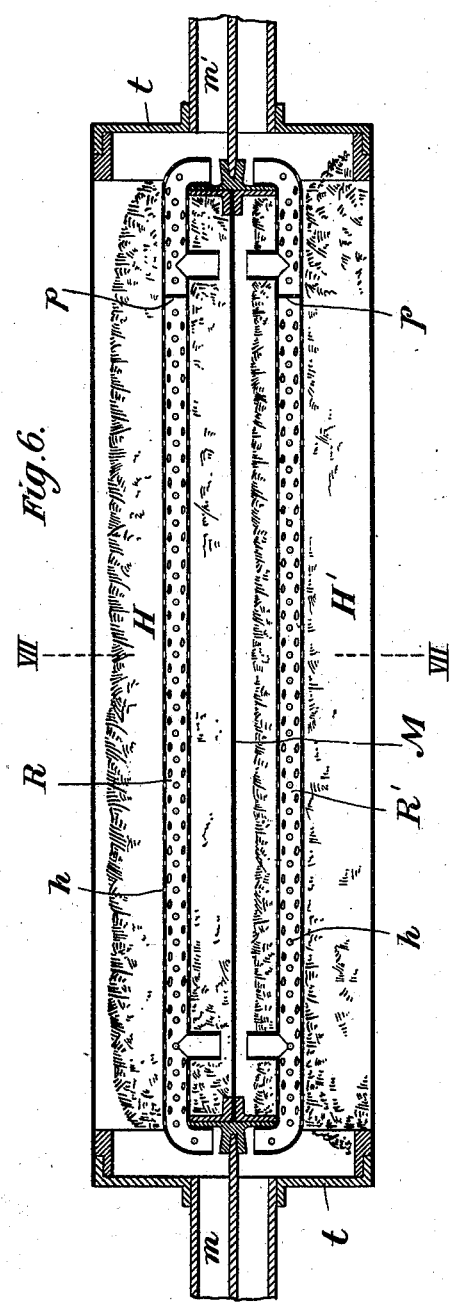
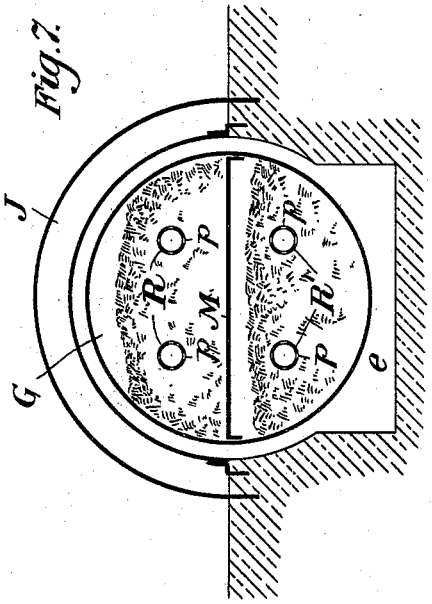
WITNESSES
INVENTOR

UNITED STATES PATENT OFFICE.

JAMES PURVES, OF PITTSBURG, PENNSYLVANIA, ASSIGNOR OF THREE-TENTHS TO HENRY L. W. HYDE, OF SAME PLACE.

PROCESS OF MAKING GAS AND APPARATUS THEREFOR.

SPECIFICATION forming part of Letters Patent No. 545,973, dated September 10, 1895.

Application filed March 29, 1895. Serial No. 543,643. (No model.)

*To all whom it may concern:*

Be it known that I, JAMES PURVES, of Pittsburg, in the county of Allegheny and State of Pennsylvania, have invented a new and useful Improvement in the Manufacture of Gas and Apparatus Therefor, of which the following is a full, clear, and exact description, reference being had to the accompanying drawings, forming part of this specification, in which—

Figure 1:
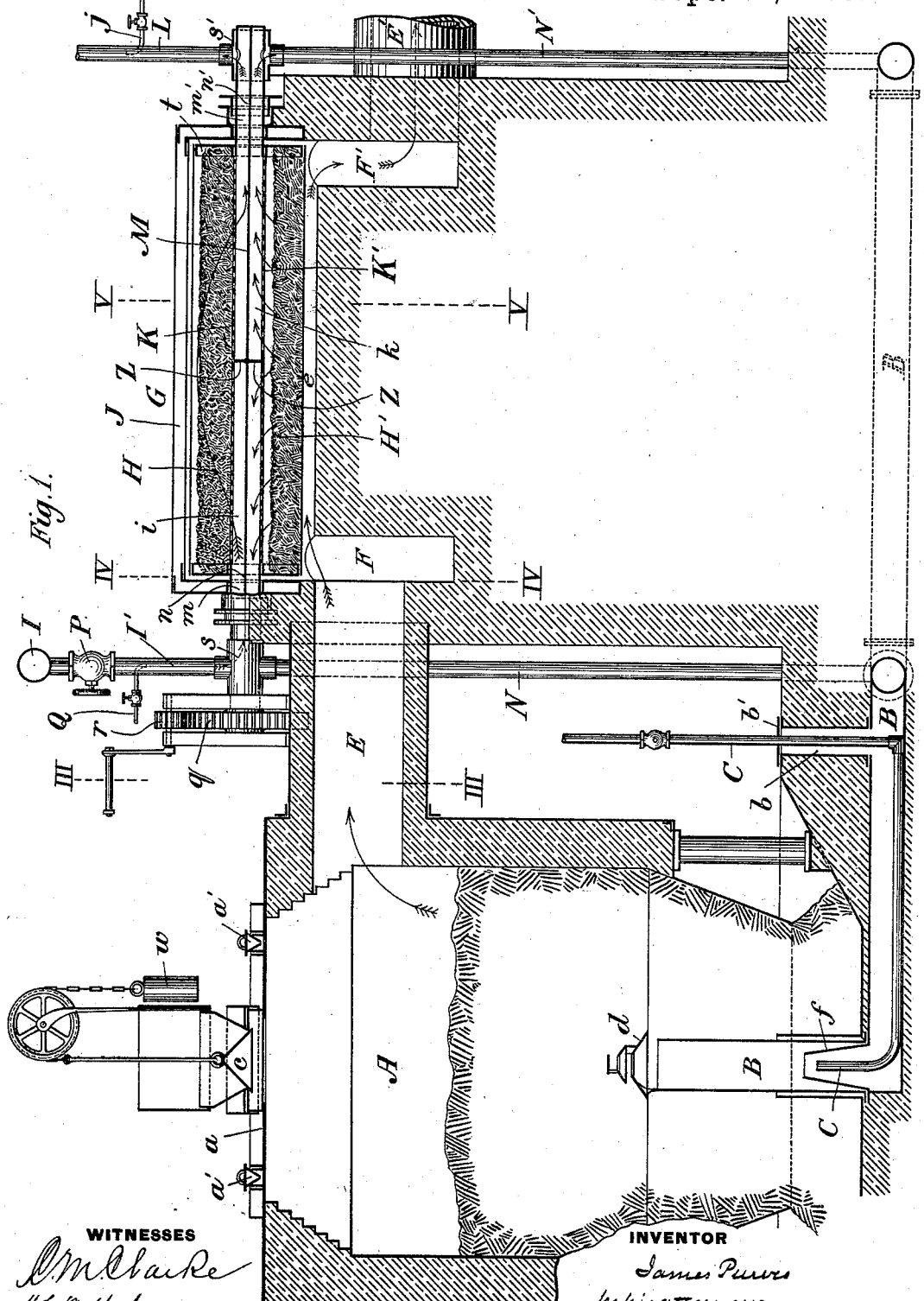
Figure 2:
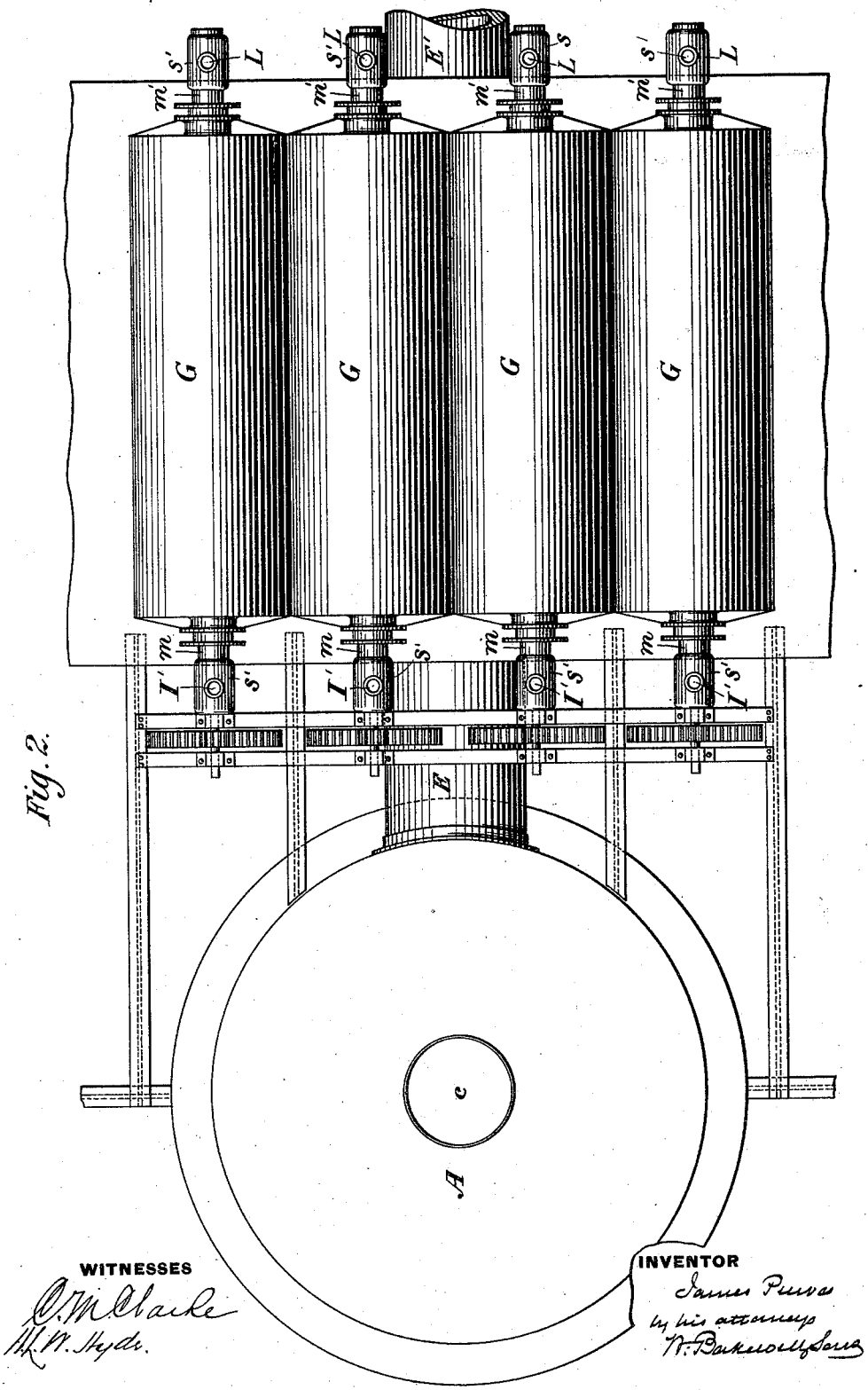
Figure 3:
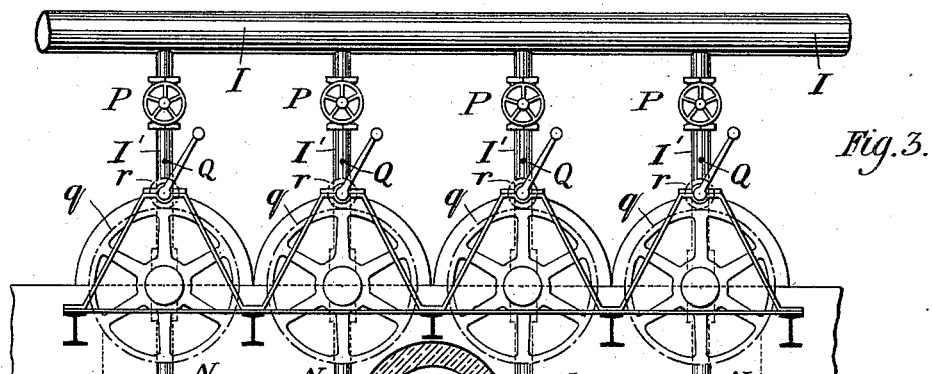
Figure 4:
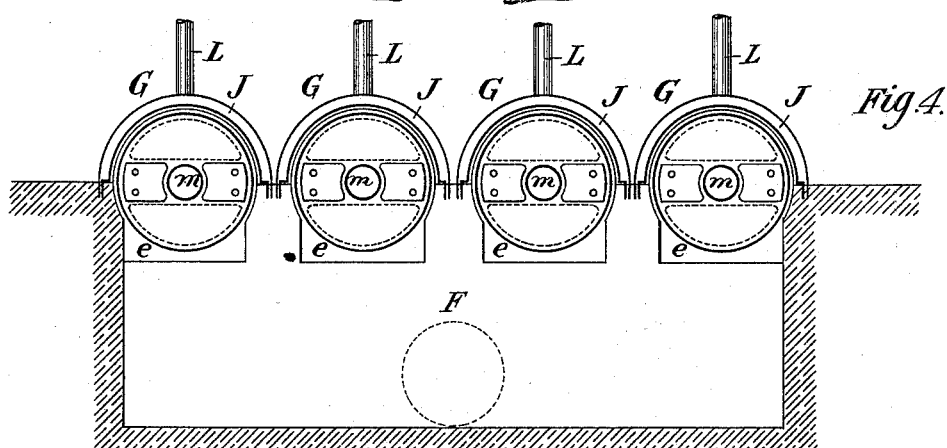
Figure 5:
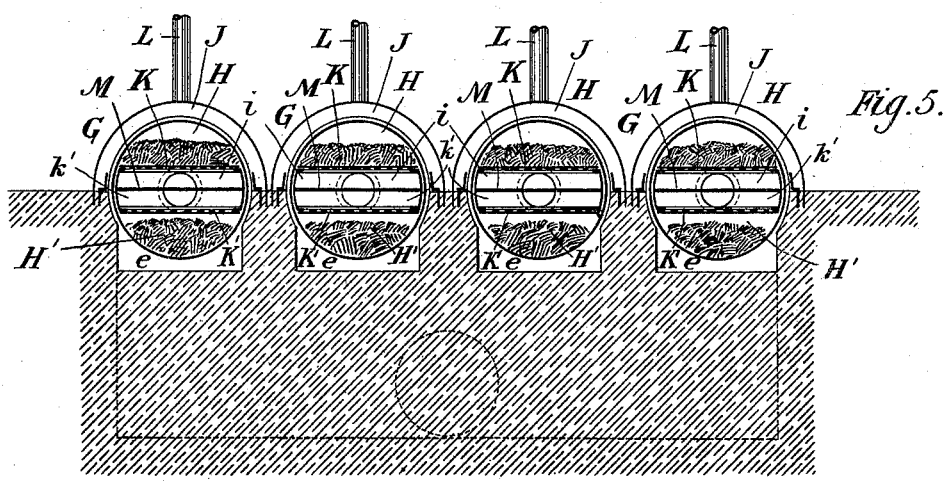

Figure 1 is a longitudinal vertical section of my improved apparatus. Fig. 2 is a plan view of the same. Figs. 3, 4, and 5 are vertical sections of my apparatus at different points in Fig. 1—viz., Fig. 3 on the line III III, Fig. 4 on the line IV IV, and Fig. 5 on the line V V. Fig. 6 is a longitudinal vertical section showing modification of retort, and Fig. 7 is a cross-section on line VII VII of Fig. 6.

In the several figures like symbols of reference denote the same parts.

The object of my invention is to produce fuel-gas of greater calorific power than that produced by ordinary methods. Fuel-gas, or gas manufactured for heating purposes, is usually produced by means of blowing air by means of a steam-jet into a producer charged with incandescent coal. Gas so manufactured usually consists of the following constituents, viz: thirty-nine per cent. of combustible gas; two to three per cent. of carbonic acid, the remaining fifty-eight or fifty-nine per cent. being nitrogen derived almost wholly from the atmospheric air used in the gasification of the coal. It will be seen that by much the larger amount of the gas thus evolved is incombustible and utterly useless for heating purposes. It is obvious, therefore, that if the presence of nitrogen could be avoided and if oxygen should be supplied without it a very large gain in the quality of the gas would result. For this purpose I blow the producer with pure oxygen (undiluted with nitrogen) and steam, which has not only the effect already indicated, but also that of making the partial combustion of the fuel in the producer much more intense. It thus permits of a much larger quantity of steam being injected into the producer than is possible in the process heretofore employed of using atmospheric air. The result of the injection of steam into the producer containing incandescent carbonaceous matter is to effect the decomposition of the vaporized water and produce the mixture of hydrogen and carbonic oxid gases known as "water-gas," so that the product of the producer is denitrogenized producer gas mixed with water-gas, and consequently free from nitrogen.

The process of manufacturing water-gas is an intermittent one; but with the use of oxygen instead of atmospheric air in the producer the mixed water-gas and coal-gas can be carried on continuously.

My improved process requires a copious supply of oxygen, which can be readily procured by separation of the gases composing atmospheric air and securing the oxygen thus liberated, but none of the known operations for that purpose prove sufficiently economical unless the substance used to effect this separation is susceptible of repeated use. Such substance is found in the oxids of the metals of the alkaline earths—such, for example, as lime, magnesia, and baryta. The last named I regard as the most efficient, and shall describe its use in this specification, without, however, intending to limit my invention to the use of that specific oxid in practicing my process.

Monoxid of barium or hydrated oxid of barium takes up oxygen when heated to a dull red heat (say 800° to 900° Fahrenheit) in contact with a current of air becoming barium peroxid; but if the heat is then raised to from 1,300° to 1,400° Fahrenheit it yields up the oxygen thus taken up and is reduced to monoxid of barium and oxygen, and the free oxygen thus obtained can be utilized for the purposes of my process and be injected into the producer. In order, however, to repeat this operation with the same oxid, and thus make the process a continuous one, it is requisite, after each such heating in the presence of atmospheric air, (by which the oxid became peroxidized), to expose it to a higher temperature with exclusion of atmospheric air, which causes it to give out the additional oxygen previously acquired, after which the temperature must be lowered to its first degree and the air again admitted. This calls for an alternate cooling and heating of the apparatus and its contents, with alternate admission and exclusion of atmospheric air, and these changes must be effected repeatedly and rapidly, which, especially if the apparatus is of moderate dimensions, presents a great difficulty to the successful use of this method of treatment. I overcome this difficulty, however, by means of an apparatus of my invention in which a retort containing the barium oxids is divided into two compartments which are exposed to different degrees of heat, one, into which the air is admitted, being heated to the temperature required to peroxidize the barium monoxid, and the other, from which the air is excluded, being heated to a higher temperature, at which the barium peroxid will become partially deoxidized and yield up pure oxygen, and connected with apparatus adapted to force the free oxygen thus obtained into the gas-producer, the retort being adapted to be reversed when the contents of the hotter side have become partially deoxidized and contents of the cooler side have become peroxidized, so that the hotter compartment may be cooled sufficiently to peroxidize the barium monoxid and the cooler compartment may be heated sufficiently to deoxidize the peroxid contents to the condition of a monoxid. By means of apparatus so constructed the operation of separating oxygen from the air and forcing it into the gas-producer is constant instead of intermittent, and the oxygen released from the peroxid, on its being reduced to a monoxid, is extracted by suction at a higher temperature than that at which peroxidation took place. Any tendency of the barium oxid to fuse at the heat necessary for the reduction of the peroxid to a monoxid I prevent, and preserve its solid condition by mixing it with lime or magnesia or similar substance which will not flux with the barium oxid, and will render the mixture infusible at any temperature to which it will be exposed in the conduct of the process. Such mixture possesses the further advantage of being more permeable to air during the reoxidation than the simple oxid.

The apparatus which I have invented for conducting the operation which I have described, consists of a producer for the coal or other carbonaceous matter which is to be gasified, retorts in which the oxygen is produced, and means for supplying steam and oxygen to the producer and atmospheric air to the retorts and for reversing the retorts to subject the different compartments of each retort alternately to the different degrees of temperature necessary for the oxidation and partial deoxidation of the contents of the retorts.

In the drawings, Fig. 1, A is the producer, which is similar in construction to ordinary steam-blown gas-producers, in shape a vertical cylinder somewhat contracted in diameter near the upper end and furnished with a gas-tight cover $a$, which has a few vents $a'$ $a''$, to permit of poking and seeing the fire. In the center of the cover $a$ is the charging-hole, furnished with a conical stopper $c$, which is counterbalanced by a weight $w$ in the usual manner. The producer is closed at its lower end, preferably water-sealed, as shown in the drawings. A pipe B is introduced through the bottom into the producer for the admission of oxygen (denitrogenated atmospheric air) and steam. This pipe rises vertically for a short distance, and its upper extremity, inside the producer, is protected with a hood $d$ from the charge of coal above it, while a free passage is left for the admission of oxygen and steam. An injector-cone $f$ is inserted in the lower end of the vertical portion of the pipe B, which enters the producer, which injector is furnished with a steam-jet through a pipe C, supplied by a steam-generator. (Not shown.) By this means the oxygen is carried into the producer and among the fuel therein in like manner as atmospheric air is introduced into the producer in ordinary practice. If it is desired to introduce atmospheric air into the producer when starting the operation, this may be done by admitting air into the pipe B in any convenient manner—as, for example, by raising an otherwise sealed cover $b'$ on a short vertical pipe $b$, which connects with the oxygen-pipe B. At the upper end of the producer A is a flue E, through which and the flue E' the producer gas passes to the gasometer or to the place where it is to be used, as the case may be. The heat of the producer gas as it emerges from the flue E, I utilize in my process of denitrogenizing atmospheric air, so as to supply the oxygen required in the producer. For this purpose a horizontal retort G, or preferably a number of retorts, depending on the requirement of the plant, is or are placed between the flues E and E', (see Fig. 1,) preferably slightly above the level of the top of the interior of the flue E, which leads directly from the producer A and over a horizontal flue $e$. Where a number of retorts G are employed, as will usually be the case, there are gas-chambers F F', one at each end of the retorts and below them, one, F, communicating with the flue E and the other, F', communicating with the flue E'. The flue $e$ extends under the retorts G from the chamber F to the chamber F'. The retorts are all alike. They are made of iron and are cylindrical in shape. There is no communication between the flue $e$ or the chambers F F' with the interior of the retorts, which are placed over, or, rather, in, the horizontal flue $e$ solely for the purpose of heating their contents.

The united capacity of the retorts is sufficient to hold rather more than double the quantity of oxygen-producing material necessary to supply the required amount of oxygen, for the reason that in each retort one half of its contents is absorbing oxygen, while the other half is yielding its absorbed oxygen, as before described. In order to effect this, the retort is divided on its axial line by an imperforate diaphragm M into two chambers H and H', between which there is no communication. At a short distance from the diaphragm M and parallel thereto, in each chamber, is a perforated plate K K', each forming a passage $i$ in one chamber and $k$ in the other chamber, between the diaphragm M and the perforated plate. A partition Z, about midway from either end of the retort, extends on both sides of the diaphragm M, from one perforated plate K to the other perforated plate K', so that the direction of flow of gas or air (as the case may be) through the passages $i$ and $k$ is regulated thereby, as indicated by arrows in Fig. 1. Over and around the upper half of the retort is a water-cooled jacket J, supplied in the usual manner by pipes with a flowing stream of cold water, so that while the horizontal flue $e$ heats the contents of the lower chamber the contents of the upper chamber will be cooled by the cold water.

The retort is supported on its horizontal axis in suitable bearings by means of the short hollow shafts $m$ and $m'$, one at each end of the retort, which connect with and form a continuation of the passages $i$ and $k$ in the retorts, having a diaphragm $n\ n'$ on the axial line dividing the interior of each short shaft $m\ m'$ into two parts for that purpose. The short hollow shaft $m'$ is closed at its outer end, and is revoluble with and forms one journal of the retort G, and has its bearing in a journal-box $s'$, and has two holes within the journal-box, which, when the retort is in operation, register with the pipes L and N', attached to the journal-box. The pipe L, connecting through the short shaft $m'$ with that chamber of the retort which is uppermost, leads to the open air, while the pipe N', connecting with the lower chamber of the retort, conducts to the oxygen-pipe B and the producer A. At the other end of the retort (nearest to the producer) the short shaft $m$ is so attached to the retort as to cause it to revolve on its axis by means of power applied to the gear-wheel $q$, keyed to the shaft, and a pinion $r$, which meshes therewith. The short hollow shaft $m$ (in like manner as shaft $m'$) has its bearing in a journal-box $s$, through which it connects with the air-pipe I' and with the pipe N, leading to the oxygen-pipe and producer.

The revolution of the retort is only a shifting motion or half-revolution on its axis, so as to bring one chamber H uppermost and in connection with the air-pipe I' and nitrogen-exhaust pipe L and to turn the other chamber H' down and put it in connection with the oxygen-pipes N and N' and with the producer A through the pipe B, and on the next semirevolution of the retort to reverse the relative positions of the chambers H and H' and correspondingly change their connection with the pipes I' L and N N'. The pipe N, like the pipe N', conducts oxygen from the lower chamber of the retort to the producer, and the pipe I' admits air, regulated by the valve P and supplied, preferably, by a blower into the upper chamber of the retort. A small steam-pipe Q enters the air-pipe I' for the purpose (after the air-supply is shut off by the valve P and before the upper chamber H, charged with peroxidized barium, is turned down) of driving off, through the pipe L, any nitrogen which may remain in that chamber. A steam-jet $j$ may be introduced into the nitrogen-exit pipe L to aid in discharging nitrogen from the upper chamber H. A horizontal pipe I supplies all the retorts with air through the vertical air-pipe I' in each.

The semirevolution of the retorts from time to time, the chief purpose of which is to change the relative positions of the chambers and the connection of one of them with the atmospheric air and nitrogen-exhaust pipe and of the other with the oxygen-pipes, performs, also, the additional function of agitation of the contents of the chambers and preventing them becoming so closely packed as to interfere with the passage of the air or gas, and when desired the retorts may be turned back and forth repeatedly to loosen up their contents.

In Figs. 6 and 7 I have shown a modification in the internal construction of the retorts G. In place of the perforated plates K K', extending through the retorts, there may be one or more pipes R R', placed above and below the imperforate diaphragm M. These pipes are perforated throughout their entire length with numerous small apertures $n$ and each pipe has a cross-partition $r$, the perforations in the pipes R in the upper chamber permitting of the entrance of atmospheric air from the pipe I' (with which the pipes R in the upper chamber communicate) into the chamber in which they are situate and through the oxid by which they are surrounded, and also permitting of the passage of the liberated nitrogen from the upper chamber into the pipe R on the farther side of the partition $p$ and thence to the nitrogen-exhaust pipe L. Thus the partition $p$ in the pipes R, like the partition Z in the passage of the previously-described construction, permits the air being drawn through the pipes R without passing into the upper chamber of the retort. The pipes R' in the lower chamber receive the oxygen liberated from the peroxidized material which surrounds them and conduct it to the pipes N and N' and through them to the producer A. This construction, it will be observed, is substantially the same as that before described, in which the perforated plates and the imperforate diaphragm form passages, as the pipes R R do for the atmospheric air into and the nitrogen from the upper chamber and as the pipes R' R' do for the oxygen from the lower chamber to the producer A.

In this specification I have referred to the chambers of the retorts by the terms "upper" and "lower" and by different letters. This is done for convenience of description. It will, however, be observed that there is no actual difference but in relative position, so that what are the upper chamber, passages, and pipes become the lower chamber, passages, and pipes when the retorts are shifted a half-revolution, as described.

The barium oxid being susceptible of repeated use and not being carried off (unless in small quantities) by the operation of my process will not need renewal for a long time. It is charged into the two chambers of the retort by disconnecting the short shafts $m\ m'$ from the retort and removing the cap $t$. Where the higher temperature to which I subject the barium peroxid in my process renders it liable to attack the lining of the retort or chamber in which it is heated, especially if such lining be of an acid or silicious character, I overcome this difficulty by using a basic lining.

My improved process as conducted in connection with the apparatus hereinbefore described is as follows: Both retorts are kept constantly charged with barium oxid, and the producer is charged from time to time with coal or other carbonaceous matter to a level somewhat below the mouth of the flue E, as shown in Fig. 1. On firing the coal in the producer at the commencement of the operation, air should be introduced, as before described, by raising the cover $b'$ of the pipe $b$ until the flow of oxygen from the retort commences, when the cover $b'$ should be closed, after which no air should be admitted into the producer. The lower chamber of the retort having been heated by the hot gas from the producer to about from 800° to 1,000° Fahrenheit, or until the barium oxid is capable of absorbing oxygen from the air, the retort is shifted a half-revolution, bringing the heated chamber to the position of chamber H in Fig. 1. Atmospheric air then enters the upper chamber through pipe I', and passing up through the perforated plate K (or pipe R, as the case may be) permeates the heated barium oxid contained therein. At the temperature just stated (800° to 1,000° Fahrenheit) the monoxid absorbs oxygen from the air until it becomes peroxidized, and in so doing the nitrogen is separated and is carried off by suction through the upper passage $i$ or pipe R above the diaphragm M and into the pipe L, through which it escapes into the air or into a suitable storage-tank. It will be noticed that the suction created by the air-jet in the pipe L is prevented by the partition Z or $p$ from drawing atmospheric air through the passage $i$ or pipe R and can only draw the nitrogen from the chamber H. As soon as the charge of oxid in the upper chamber H becomes surcharged with oxygen or converted into peroxid the retort is again shifted one-half a revolution, bringing the chamber containing barium monoxid on top and the other chamber, containing the barium peroxid, down and immediately over the flue $e$. The heat of the chamber which is brought to the top is soon reduced by the cooling influence of the water-jacket J and the air-blast and soon reaches the temperature at which the barium monoxid begins to absorb oxygen from the air, while the peroxid contained in the chamber which has been turned down is quickly heated, say, to 1,300° or 1,400° Fahrenheit, sufficiently to cause it to become reduced to monoxid, liberating the oxygen absorbed in the chamber at a lower heat, the contents of this chamber being then barium monoxid and oxygen. The surplus oxygen as fast as liberated is drawn by the suction of the injector $f$ in the producer through the perforated plate below the diaphragm M and into the passage $k$, whence it passes in two directions—on both sides of the partition Z to the pipes N and N' and thence through pipe B to the producer. (See arrows in Fig. 1.) When on shifting the retort the lower chamber, containing barium monoxid hot from the preceding operation of liberating oxygen, is turned up, its contents may at first be at too high a temperature to take up oxygen from the air, but the cooling influence of the injected external air and of the water-jacket on top of the retort will soon cause the barium oxid to cool down to that temperature at which it most readily absorbs oxygen. Thus it will be seen that in each retort there will be going on at the same time in the upper compartment the absorption of oxygen and the liberation of nitrogen from the atmospheric air by reason of the affinity for oxygen of barium monoxid when heated to about 800° or 900° Fahrenheit, while at the same time in the lower compartment the barium peroxid, by being heated to from 1,300° to 1,400° Fahrenheit, is being partially deoxidized, thus liberating oxygen, which is carried to the producer to support the combustion of the fuel therein.

As barium oxid takes up oxygen more readily from moist than from dry air, it will be advantageous to admit a small amount of steam into the inflowing air-pipe I' through the steam-pipe Q when forcing the air into the pipe I' by a blower. After passing under the retorts and out through the flue E' the gas will still be of a temperature high enough to be used for the purposes of raising the steam, or at least part of the steam, necessary for running the producer. I therefore pass the gas through or under a steam-generator (not shown) and thence to the place of storage or consumption.

I have described my process and apparatus as applied to a producer for fuel-gas; but it is obviously equally applicable to the generation of oxygen and nitrogen separately from atmospheric air independently entirely of the use of oxygen in a fuel-gas producer.

I am aware that the separation of atmospheric air into oxygen and nitrogen by the barium process is not new in itself; but my invention consists in the apparatus and process herein described, whereby I am enabled to obtain a continuous supply of oxygen or nitrogen or of each separately without subjecting the process to the delays incident to frequent changes of temperature or of pressure, as heretofore practiced, while at the same time securing all the advantages, especially of more rapid production, incident to the peroxidation of the monoxid and the consequent liberation of nitrogen at one temperature and the deoxidation of the peroxid, and the consequent liberation of oxygen at a higher temperature.

Having thus described my improvement, what I claim as my invention, and desire to secure by Letters Patent, is—

1. In the manufacture of gas, the improvement which consists in generating gas in a producer, conducting such gas into contact with a retort containing a higher oxid, and by the sensible heat of the gas, splitting such oxid into the lower oxid and oxygen, and conducting the oxygen so formed to the producer; substantially as described.

2. The process of subjecting the oxid of barium or other suitable oxid contained in separate chambers of a retort simultaneously to different temperatures for the purpose of raising the oxid in one chamber to a higher degree of oxidation by the application of heat and atmospheric air, and at the same time raising the heat of the higher oxid in the other chamber, from which atmospheric air is excluded, for the purpose of the partial deoxidation of the higher oxid to liberate oxygen, and carrying on this operation by alternately exposing the oxid to such conditions, and thus obtaining a constant, as distinguished from an intermittent supply of oxygen, substantially as described.

3. The process of making fuel gas by the decomposition of carbonaceous fuel by means of heat and oxygen gas as the supporter of combustion, to the exclusion of nitrogen or atmospheric air, consisting of the following steps,—subjecting the fuel to incandescent heat in a substantially gas-tight producer, exposing to the heat of gas thus produced one or more retorts, each containing in separate and non-connecting chambers a suitable metallic oxid capable of absorbing oxygen when heated in contact with a current of air or oxygen, and of liberating the oxygen so absorbed when raised to a higher temperature, one chamber of each retort containing the lower oxid being supplied with atmospheric air and exposed to a heat sufficient to cause the absorption of oxygen by such oxid contained therein, and the other chamber containing the higher oxid, with exclusion of atmospheric air, being simultaneously exposed to a heat sufficient to cause the reduction of the higher oxid to the condition of a lower oxid by the liberation of the previously absorbed oxygen, and passing the oxygen thus obtained to the producer for the support of the necessary heat therein, and alternately shifting the position of the retort so as to change the temperature to which the separate chambers are exposed and thus securing a continuous production of fuel gas by means of a constant supply of oxygen obtained by the action of heat and air on metallic oxids of the class described, substantially as and for the purpose set forth.

4. Apparatus, substantially such as hereinbefore described, for the continuous generation of oxygen gas, consisting of a horizontal retort divided into two separate non-communicating compartments for holding separate charges of the metallic oxid, to be used for extracting oxygen from atmospheric air, said retort having a water-cooled jacket on top and a flue from a furnace, or other means of heating, below, together with means, substantially such as described, for passing atmospheric air through the contents of the cooler compartment, and the escape therefrom of the liberated nitrogen; and the other and hotter compartment provided with means for the exit of oxygen, liberated from the contents of said compartment, to a suitable receiver, or place of consumption; said retort being adapted to be shifted from time to time so as to agitate or shake up the contents of its compartments and expose these compartments alternately to the heat of the furnace or the influence of the cooling device, substantially as and for the purpose described.

5. The combination of the gas producer A, one or more retorts each divided into two separate non-communicating chambers H H' and having two separate non-communicating gas passages $i$ and $k$, or pipes R R', means of heating one of said chambers and of simultaneously cooling the other, means of agitating contents of said retort and of shifting said retort so as to expose the chambers to the heating and cooling devices alternately, means for the supply of atmospheric air to and escape of nitrogen from the cooler chamber, and means for carrying the oxygen liberated in the more highly heated chamber to the producer A, substantially as and for the purpose described.

6. Apparatus for the continuous generation of oxygen from atmospheric air by alternate changes of temperature of a metallic oxid, consisting of a cylindrical retort divided into two separate non-communicating chambers, by means of a central imperforate diaphragm, a perforated plate or pipe on each side of said diaphragm forming gas passages through the retort for permitting the passage of air and gas (as the case may be) through each chamber, means for supplying atmospheric air at one end of one of said passages and through its chamber, and for the escape of nitrogen gas from said chamber at the other end of its passage; and means for the escape of oxygen gas from the passage communicating with the other chamber, means for applying heat to one of the chambers of the retort and simultaneously applying cold to the other chamber, and means for shifting said retort on its axis so as alternately to expose either of said chambers to the action of heat to raise its temperature, while the other chamber is exposed to the action of cold to lower its temperature, substantially as and for the purpose described.

In testimony whereof I have hereunto set my hand this 28th day of March, 1895.

JAMES PURVES.

Witnesses:
　THOMAS W. BAKEWELL,
　HENRY L. W. HYDE.